(12) United States Patent
Kuzma et al.

(10) Patent No.: US 9,440,565 B2
(45) Date of Patent: Sep. 13, 2016

(54) UNLOCKING UNIT FOR A VEHICLE SEAT, AND VEHICLE SEAT

(71) Applicant: Johnson Controls GmbH, Burscheid (DE)

(72) Inventors: Martin Kuzma, Trencin (SK); Maros Rovny, Trencin (SK)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 14/417,911

(22) PCT Filed: Jul. 25, 2013

(86) PCT No.: PCT/EP2013/065721
§ 371 (c)(1),
(2) Date: Jan. 28, 2015

(87) PCT Pub. No.: WO2014/019930
PCT Pub. Date: Feb. 6, 2014

(65) Prior Publication Data
US 2015/0175041 A1  Jun. 25, 2015

(30) Foreign Application Priority Data
Jul. 31, 2012  (DE) ........................ 10 2012 015 288

(51) Int. Cl.
*A47C 1/00* (2006.01)
*B60N 2/44* (2006.01)

(52) U.S. Cl.
CPC ....... *B60N 2/442* (2013.01); *B60N 2002/4455* (2013.01)

(58) Field of Classification Search
CPC .... B60N 2/07; B60N 2/0715; B60N 2/0722; B60N 2/0725; B60N 2/0727; B60N 2/08; B60N 2/0862; B60N 2/42736; B60N 2/4214; B60N 2/442; B60N 2002/4455; B60R 21/015
USPC ........ 297/463.1, 329, 344.1, 216.18, 316.16, 297/217.2, 316
See application file for complete search history.

(56) References Cited

U.S. PATENT DOCUMENTS 5,547,242 A * 8/1996 Dukatz .............. B60N 2/01583
116/283
5,601,338 A * 2/1997 Wahls ...................... A47C 7/14
116/285

(Continued)

FOREIGN PATENT DOCUMENTS

DE  197 13 753 C2  2/2000
DE  101 63 611 A1  7/2003

(Continued)

*Primary Examiner* — Jose V Chen
(74) *Attorney, Agent, or Firm* — McGlew and Tuttle, P.C.

(57) ABSTRACT

An unlocking unit (10), for a vehicle seat (1), transmits a movement introduced via an actuation element (62) to at least two locking devices (90) for unlocking purposes. Each locking device (90) is paired with an unlocking element (11, 12) and the unlocking element (11, 12) is in the locked position when the respective locking device (90) is locked and in the unlocked position when the respective locking device (90) is unlocked. A display element (64) is in the display position when the locking devices (90) are unlocked and is in the non-display position when the locking devices (90) are locked. Each unlocking element (11, 12) which can be found in the unlocked position prevents the display element (64) from moving into the non-display position, and the display element (64) remains in the display position as long as at least one locking device (90) is unlocked.

16 Claims, 5 Drawing Sheets

(56) References Cited

U.S. PATENT DOCUMENTS

| | | |
|---|---|---|
| 6,139,076 A | 10/2000 | Hara et al. |
| 2004/0070250 A1* | 4/2004 | Cooley .................... B60N 2/12 297/344.1 |
| 2004/0113474 A1* | 6/2004 | Lambrecht ............. B60N 2/067 297/344.1 |
| 2004/0124683 A1* | 7/2004 | Matsumoto .......... B60N 2/0705 297/344.1 |
| 2006/0108847 A1* | 5/2006 | O'Callaghan ...... B60N 2/01583 297/344.1 |
| 2007/0132293 A1* | 6/2007 | Moriyama ........... B60N 2/0232 297/337 |
| 2008/0143160 A1* | 6/2008 | Schmale ................. B60N 2/20 297/344.1 |
| 2008/0231101 A1* | 9/2008 | Sakakibara .......... B60N 2/0705 297/344.1 |
| 2008/0231102 A1* | 9/2008 | Elio ....................... B60N 2/073 297/344.1 |
| 2008/0238167 A1* | 10/2008 | Koga ................... B60N 2/0232 297/344.1 |
| 2008/0277986 A1* | 11/2008 | Herringshaw ....... B60N 2/0705 297/344.1 |
| 2009/0289485 A1* | 11/2009 | Walter ................. B60N 2/0705 297/344.1 |
| 2011/0006576 A1* | 1/2011 | Muller ............... B60N 2/01583 297/378.13 |
| 2013/0221726 A1* | 8/2013 | Kalinowski ........ B60N 2/01591 297/463.1 |
| 2013/0320736 A1* | 12/2013 | Teufel ................. B60N 2/2356 297/383 |
| 2014/0138996 A1* | 5/2014 | Kramm ................ B60N 2/0881 297/344.1 |

FOREIGN PATENT DOCUMENTS

| | | |
|---|---|---|
| DE | 102 30 637 A1 | 1/2004 |
| DE | 10 2004 045 988 B3 | 12/2005 |
| DE | 101 42 486 B4 | 12/2005 |
| DE | 10 2005 006 565 A1 | 8/2006 |
| DE | 10 2006 017 491 A1 | 10/2006 |
| DE | 10 2007 060 922 A1 | 3/2009 |
| DE | 10 2006 015 922 B4 | 7/2009 |
| DE | 10 2010 052 273 A1 | 5/2012 |
| WO | 2004 069585 A1 | 8/2004 |
| WO | 2010/003587 A1 | 1/2010 |

* cited by examiner

UNLOCKING UNIT FOR A VEHICLE SEAT, AND VEHICLE SEAT

CROSS REFERENCE TO RELATED APPLICATIONS

This application is a United States National Phase Application of International Application PCT/EP2013/065721 filed Jul. 25, 2013 and claims the benefit of priority under 35 U.S.C. §119 of German Patent Application DE 10 2012 015 288.4 filed Jul. 31, 2012, the entire contents of which are incorporated herein by reference.

FIELD OF THE INVENTION

The invention to an unlocking unit for a vehicle seat with at least two locking devices, which unlocking unit transmits a movement, which is introduced via an actuating element, for unlocking purposes to the at least two locking devices, wherein each locking device is in each case assigned an unlocking element, wherein, when the locking device is locked, the assigned unlocking element is in the locking position and wherein, when the locking device is unlocked, the assigned unlocking element is in the unlocking position. The invention also relates to a vehicle seat with such an unlocking unit.

BACKGROUND OF THE INVENTION

DE 10 2010 052 273 A1 discloses an unlocking unit of the type in question and a vehicle seat of the type in question. The vehicle seat here comprises a pivotable backrest which is lockable to the seat structure of the vehicle seat by means of two locking devices. By unlocking said locking devices, the backrest is pivotable about a horizontal pivot axis. The two locking devices here are unlockable simultaneously.

DE 10 2006 015 922 B4 also discloses a vehicle seat of the type in question. The vehicle seat here is lockable to a seat rail by means of two locking devices. By unlocking said two locking devices, the vehicle seat is detachable from the seat rail and is removable from the vehicle. The two locking devices are unlockable simultaneously.

After the vehicle seat is reinserted into the vehicle, it is important to lock the two locking devices in order to hold the vehicle seat securely. Checking of the locking state of the locking devices is visually possible. That is to say, a user can look at each individual locking device and can see whether said locking device is locked or unlocked.

DE 102 30 637 A1 discloses a vehicle seat with a locking device for locking a backrest of the vehicle seat to a vehicle body. The locking device comprises an optical display element which indicates whether the locking device is locked or unlocked.

SUMMARY OF THE INVENTION

The invention is based on the problem of improving an unlocking unit of the type mentioned at the beginning, in particular of providing a display for the locking state of the two locking devices, which display indicates whether the two locking devices are locked.

An unlocking unit of the type in question for a vehicle seat for unlocking at least two locking devices, which unlocking unit transmits a movement, which is introduced via an actuating element, for unlocking purposes to the at least two locking devices, comprises two unlocking elements, wherein each locking device is in each case assigned an unlocking element, and wherein, when the locking device is locked, the assigned unlocking element is in the locking position, and wherein, when the locking device is unlocked, the assigned unlocking element is in the unlocking position.

According to the invention, a display element is provided which is in the display position when the at least two locking devices are unlocked, and which is in the non-display position when the at least two locking devices are locked, and each unlocking element located in the unlocking position prevents a movement of the display element into the non-display position, wherein the display element remains in the display position as long as at least one locking device is unlocked.

As a result, the display element remains in the display position as long as at least one unlocking element is in the unlocking position. Only when all of the locking devices are locked and all of the assigned unlocking elements are in the locking position does the display element move into the non-display position.

The display element here is preferably connected fixedly to the actuating element or is formed integrally therewith. As a result, a user can already see the locking state of the locking devices by way of the actuating element itself.

The actuating element here is preferably designed as a flexible belt strap and, as a result, is cost-effective and handleable in a simple manner. The display element here can be configured as a display region marked in color on the belt strap.

According to an advantageous development of the invention, a gearwheel mechanism is provided which transmits a movement, which is introduced via the actuating element, for unlocking purposes to the unlocking elements. The unlocking elements transmit the movement for unlocking purposes further to the locking devices.

The gearwheel mechanism advantageously comprises an unlocking lever with an unlocking toothing and a control gearwheel with a control toothing, wherein the unlocking lever is connected to the actuating element. The unlocking toothing meshes here with the control toothing.

According to an advantageous refinement of the invention, in the event of a movement, which is introduced via the actuating element, for unlocking purposes, the control gearwheel first passes through an idle travel and then carries along the unlocking elements.

For this purpose, a driver is preferably attached to the control gearwheel, said driver striking against a first counterstop of the first unlocking element and against a second counterstop of the second unlocking element.

The unlocking lever here has a stop element which, when the unlocking element is in the unlocking position, is in contact with the unlocking element. As a result, the display element, which is kinematically coupled to the unlocking lever, remains in the display position until all of the unlocking elements are in the locking position.

Advantageously, a control spring is arranged in each case between the control gearwheel and each unlocking element, which control spring loads the unlocking element relative to the control gearwheel toward the unlocking position.

The unlocking elements and the control gearwheel are advantageously mounted rotatably about a common control pivot axis, as a result of which the design of the unlocking unit is simplified.

The control gearwheel here is preferably arranged in the axial direction between the first unlocking element and the second unlocking element.

A simple design of the unlocking unit is also produced if the unlocking lever is mounted pivotably about an actuating pivot axis which runs parallel to the control pivot axis.

The unlocking unit preferably also has a return spring which loads the unlocking lever constantly in the direction of a rest position.

Each locking device is in each case connected by means of a Bowden cable to the assigned unlocking element. As a result, the unlocking unit is arrangeable so as to be removed from the locking devices.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
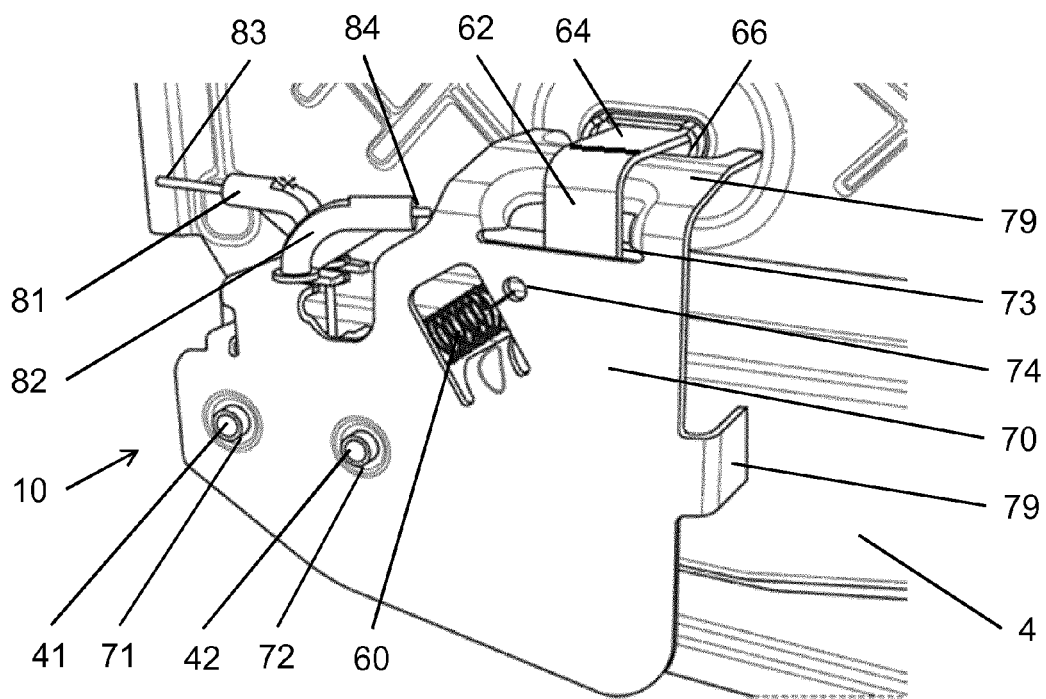
FIG. 1 is a perspective illustration of an unlocking unit.
Figure 2:
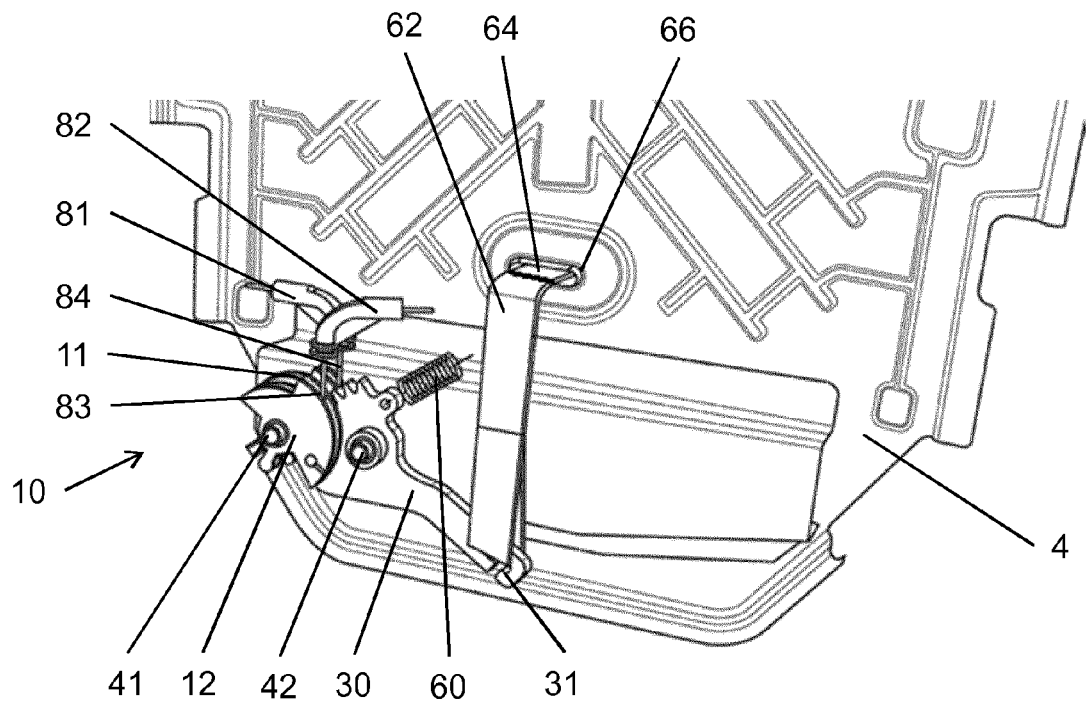
FIG. 2 is a perspective illustration of the unlocking unit from FIG. 1 with the baseplate removed.

A vehicle seat 1 for a motor vehicle has a seat part 2 and a backrest 3. The arrangement of the vehicle seat 1 within the vehicle and the customary direction of travel thereof define the direction information used in the following text. In this case, a direction which is oriented perpendicularly with respect to the ground is referred to below as the vertical direction and a direction perpendicular with respect to the vertical direction and perpendicular with respect to the direction of travel is referred to below as the transverse direction.

The backrest 3 is attached to the seat part 2 so as to be pivotable about an axis running in the transverse direction and comprises, inter alia, a backrest plate 4. By means of an adjustment fitting, the backrest 3 is adjustable in a plurality of angular positions relative to the seat part 2. A headrest 7 which is of height-adjustable and inclination-adjustable configuration in the present case is attached to one end of the backrest 3, which end faces away from the seat part.

The vehicle seat 1 is displaceable in the direction of travel by means of two pairs of rails which run approximately in the direction of travel and which in each case have a lower rail 5 connected to the vehicle structure and an upper rail 6 guided in the lower rail 5. The upper rails 6 are lockable to the lower rails 5 by means of a rail locking unit (not illustrated). The two pairs of rails here are arranged next to each other in the transverse direction and in a manner running in parallel.

The seat part 2 here is connected detachably to the upper rails 6. For this purpose, the seat part 2 has a respective front foot 8 on both sides in the front region in the direction of travel, which foot, in the present case, enters the respective upper rail 6 and latches there. Furthermore, the seat part 2 has a respective rear foot 9 on both sides in the rear region in the direction of travel, which foot comprises a locking device 90. A locking device of this type is disclosed, for example, in WO 2004 069 585 A1, the disclosure of which in this regard is expressly incorporated.

In the use position of the vehicle seat 1, the locking devices 90 are locked to bolts attached to the respective upper rails 6. In order to transfer the vehicle seat 1 into a package position, the two locking devices 90 of the rear feet 9 are opened simultaneously, as a result of which the rear feet 9 are detached from the upper rails 6. A vehicle seat configured in such a manner is disclosed, for example, in DE 10 2006 015 922 B4, the disclosure of which in this regard is expressly incorporated.

The front feet 8 can also in each case have a locking device, as is also disclosed in DE 10 2006 015 922 B4. It is also conceivable that the vehicle seat 1 does not have any pairs of rails for the longitudinal adjustment, but rather that the front feet 8 and the rear feet 9 are connected directly to the vehicle structure.

An unlocking unit 10 which is fastened to the backrest plate 4 is provided for the simultaneous unlocking of the two locking devices 90 of the rear feet 9. The unlocking unit 10 here is arranged on the front side of the backrest plate 4 in the direction of travel.

The unlocking unit 10 comprises a baseplate 70 which is arranged substantially parallel to the backrest plate 4 and which, together with the backrest plate 4, forms a partial encapsulation of the remaining parts of the unlocking unit 10. A plurality of webs 79 protrude at right angles from the baseplate 70, wherein those ends of the webs 79 which face away from the baseplate 70 are inserted into corresponding openings in the backrest plate 4 such that the baseplate 70 is fastened to the backrest plate 4 in an interlocking manner.

The baseplate 70 furthermore has a first bearing opening 71 which serves for the mounting of a rotary control pin 41, and a second bearing opening 72 which serves for the mounting of a rotary actuating pin 42. In the present case, the rotary control pin 41 and the rotary actuating pin 42 have an approximately cylindrical shape and are connected to the baseplate 70. Those ends of the rotary actuating pin 42 and of the rotary control pin 41 that face away from the baseplate 70 are mounted here in corresponding openings in the backrest plate 4.

The cylinder axis of the rotary actuating pin 42, which cylinder axis is referred to below as the actuating pivot axis 44, protrudes at right angles from the baseplate 70 and from the backrest plate 4. Similarly, the cylinder axis of the rotary control pin 41, which cylinder axis is referred to below as the control pivot axis 43, protrudes at right angles from the baseplate 70 and from the backrest plate 4. The control pivot axis 43 and the actuating pivot axis 44 therefore run parallel to each other.

An unlocking lever 30 is mounted pivotably about the actuating pivot axis 44 of the rotary actuating pin 42. For this purpose, the unlocking lever 30 in the present case has a continuous, circular lever opening 35 through which the rotary actuating pin 42 penetrates. A return spring 60 is hooked at a first end into a spring eye 32 of the unlocking lever 30. The second end of the return spring 60, which end faces away from the first end, is hooked into a fastening eye 74 on the baseplate 70. In the present case, the return spring 60 is configured as a spiral tension spring and loads the unlocking lever 30 constantly in the direction of a rest position.

On a first arm, the unlocking lever 30 has a belt eye 31, into which a belt strap 62 which serves as an actuating element is hooked. The belt strap 62 runs first of all from the belt eye 31 in the vertical direction to a belt leadthrough 73 on the baseplate 70. The belt leadthrough 73 is an opening in the baseplate 70 in the region of a web 79. At the belt leadthrough 73, the belt strap 62 is deflected counter to the direction of travel and is guided to a belt opening 66 in the backrest plate 4. The belt strap 62 is guided through the belt opening 66 and protrudes out of the backrest 3 counter to the direction of travel, i.e. toward the rear. At that end of the belt strap 62 which protrudes out of the backrest 3, a display region 64 which serves as a display element is provided, which display region is designed in an optically conspicuous manner, in the present case colored red.

By pulling on that end of the belt strap 62 which protrudes out of the backrest 3, the unlocking lever 30 is pivoted about the actuating pivot axis 44 in the direction of the actuating position thereof. A limiting element 78 provided on the baseplate 70 acts as a stop and limits the movement of the unlocking lever 30 after the actuating position is reached.

A control gearwheel 20 is mounted so as to be rotatable about the control pivot axis 43 of the rotary control pin 41. For this purpose, in the present case, the control gearwheel 20 has a continuous, circular gearwheel opening 25 which is penetrated by the rotary control pin 41. Approximately along half of its circumference, the control gearwheel 20 has a control toothing 23 which meshes with an unlocking toothing 33 of the unlocking lever 30. The unlocking toothing 33 here is attached to a second arm of the unlocking lever 30, which arm lies approximately diametrically opposite the first arm with the belt eye 31.

A first unlocking element 11 is mounted on the rotary control pin 41 axially next to the control gearwheel 20 so as to be rotatable about the control pivot axis 43. The first unlocking element 11 has, inter alia, a cylinder-segment-like region with a first lateral surface 55, in which a first guide groove 15 is formed. A first Bowden cable 83 is inserted into the first guide groove 15. The end of the first Bowden cable 83 has a first nipple 85 which is hooked into a first Bowden cable hook-in means 13 of the first unlocking element 11.

The first Bowden cable 83 runs from the first unlocking element 11 in the vertical direction to a first deflecting bow 81 which is fastened to the baseplate 70 at a first recess 75. The first Bowden cable 83 runs further through the first deflecting bow 81, is deflected there approximately at right angles and runs further as far as one of the two locking devices 90.

A second unlocking element 12 is likewise mounted on the rotary control pin 41 axially next to the control gearwheel 20 so as to be pivotable about the control pivot axis 43. The second unlocking element 12 has, inter alia, a cylinder-segment-like region with a second lateral surface 56, in which a second guide groove 16 is formed. A second Bowden cable 84 is inserted into the second guide groove 16. The end of the second Bowden cable 84 has a second nipple 86 which is hooked into a second Bowden cable hook-in means 14 of the second unlocking element 12.

The second Bowden cable 84 runs from the second unlocking element 12 in the vertical direction to a second deflecting bow 82 which is fastened to the baseplate 70 at a second recess 76. The second Bowden cable 84 runs further through the second deflecting bow 82, is deflected there approximately at a right angle and runs further as far as the other of the two locking devices 90.

When the unlocking unit 10 is in the starting position, the unlocking lever 30 is in the rest position, the control gearwheel 20 is in the locking position, the unlocking elements 11, 12 are in the locking position, and the two locking devices 90 are locked. If the unlocking unit 10 is in the activating position, the unlocking lever 30 is in the actuating position, the control gearwheel 20 is in the unlocking position, the unlocking elements 11, 12 are in the unlocking position, and the two locking devices 90 are unlocked.

A first control spring 51 which loads the first unlocking element 11 relative to the control gearwheel 20 toward the unlocking position is arranged between the control gearwheel 20 and the first unlocking element 11. Similarly, a second control spring 52 which loads the second unlocking element 12 relative to the control gearwheel 20 toward the unlocking position is arranged between the control gearwheel 20 and the second unlocking element 12. In the present case, the control springs 51, 52 are designed as torsion leg springs and are inserted into corresponding openings in the unlocking elements 11, 12 and the control gearwheel 20. In the axial direction with respect to the control pivot axis 43, the control gearwheel 20 here is arranged between the first unlocking element 11 and the second unlocking element 12. The control springs 51, 52 are in each case located between the control gearwheel 20 and the associated unlocking element 11, 12.

Figure 3:
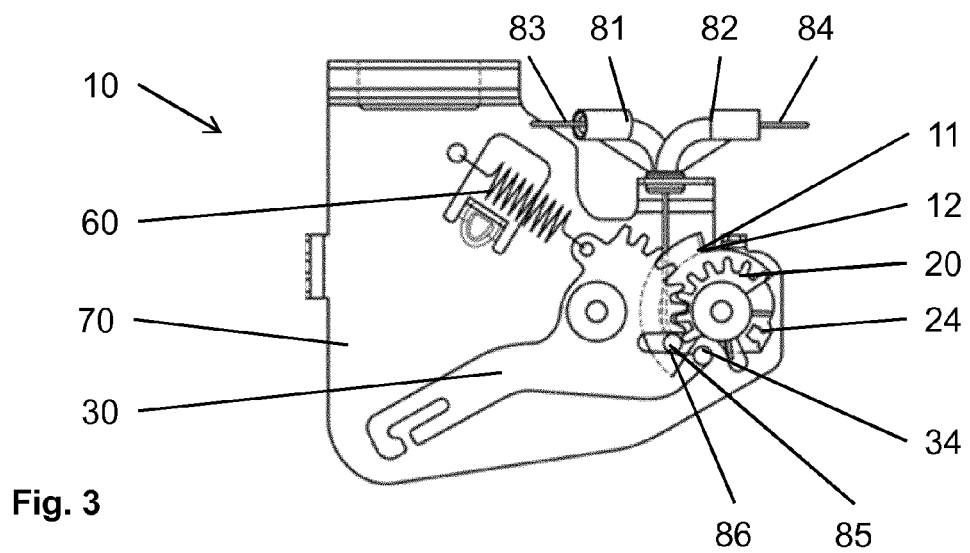
FIG. 3 is a schematic illustration of the unlocking unit with locked locking devices in a starting position.

In the starting position of the unlocking unit 10, which starting position is illustrated in FIG. 3, one end of the belt strap 62 protrudes out of the backrest 3 toward the rear. The display region 64 here is located substantially within the backrest 3 and is not visible on the outside. The display region 64 is in the non-display position. This signals to a user that the two locking devices 90 are locked.

Figure 4:
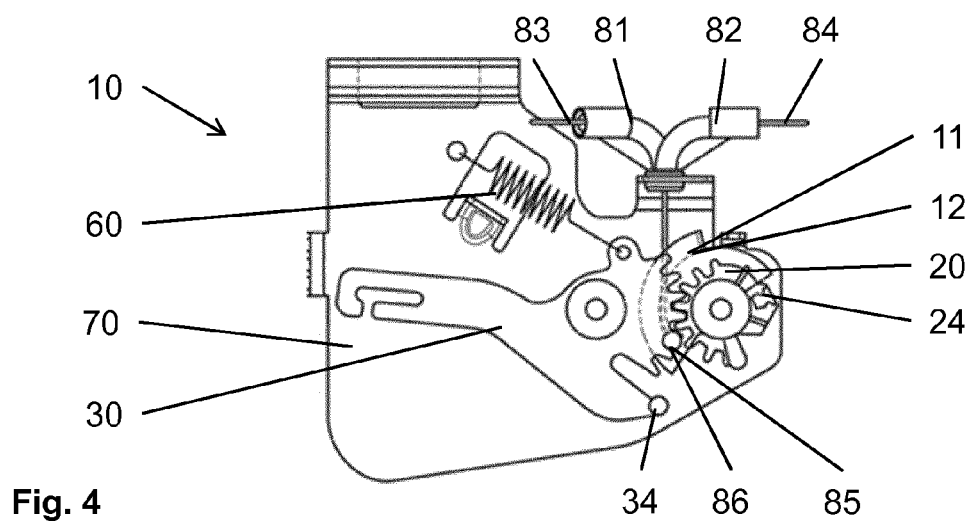
FIG. 4 is a schematic illustration of the unlocking unit during the unlocking of the locking devices.

By pulling on that end of the belt strap 62 which protrudes out of the backrest 3, the unlocking lever 30 is pivoted in the direction of the actuating position counter to the force of the return spring 60. The control gearwheel 20 is rotated here in the direction of the unlocking position. After the control gearwheel 20 has passed through an idle travel, a driver 24 which is attached to the control gearwheel 20 strikes against a first counterstop 17 of the first unlocking element 11 and against a second counterstop 18 of the second unlocking element 12, as illustrated in FIG. 4.

In the present case, the driver 24 is attached in a region of the control gearwheel 20, which region lies diametrically opposite the control toothing 23, and protrudes in the axial direction on both sides from said control gearwheel 20. The counterstops 17, 18 of the unlocking elements 11, 12 are substantially designed as smooth surfaces which run in the radial and axial direction.

Figure 5:
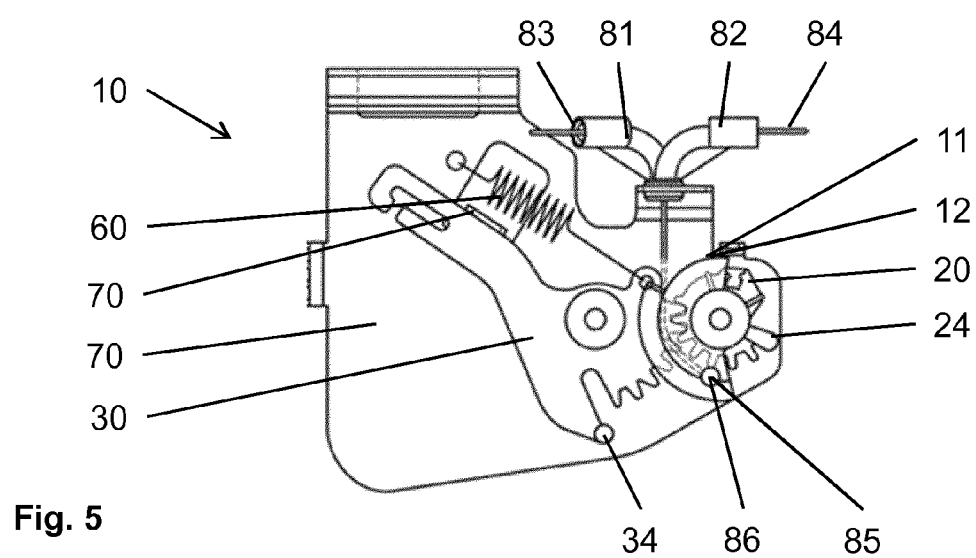
FIG. 5 is a schematic illustration of the unlocking unit with unlocked locking devices in an activating position.

By further pulling on the end of the belt strap 62, the control gearwheel 20 carries along the unlocking elements 11, 12, as a result of which said unlocking elements are rotated in the direction of the unlocking position. Pulling takes place here on the Bowden cables 83, 84, as a result of which the unlocking devices 90 are unlocked. This movement ends when the unlocking lever 30 strikes against the limiting element 78 and the unlocking unit 10 is in the activating position, as illustrated in FIG. 5. The display region 64 of the belt strap 62 protrudes here out of the backrest 3 and is visible on the outside. The display region 64 is in the display position. This signals to a user that at least one of the two locking devices 90 is unlocked.

Figure 6:
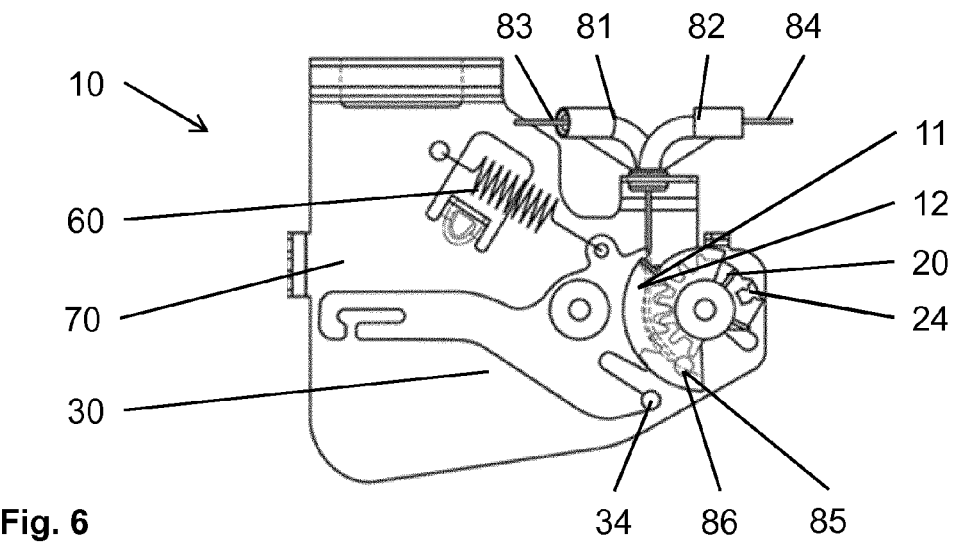
FIG. 6 is a schematic illustration of the unlocking unit after the unlocking of the locking devices and with the unlocking lever pivoting back.

If the user then releases the belt strap 62, the unlocking lever 30 is pivoted in the direction of the rest position by the force of the return spring 60. As a result, the control gearwheel 20 is also rotated in the direction of the locking position, and the driver 24 moves away from the counter-stops 17, 18 of the unlocking elements 11, 12. The unlocking elements 11, 12 remain in the unlocking position because of the loading by the control springs 51, 52. This state is illustrated in FIG. 6.

The movement of the unlocking lever 30 ends when a stop element 34 of the unlocking lever 30 strikes against the first lateral surface 55 and/or against the second lateral surface 56. In the present case, the stop element 34 is of cylindrical configuration and is attached to a third arm of the unlocking lever 30, which arm is arranged close to the second arm with the unlocking toothing 33, and protrudes in the axial direction on both sides from the third arm.

Figure 7:
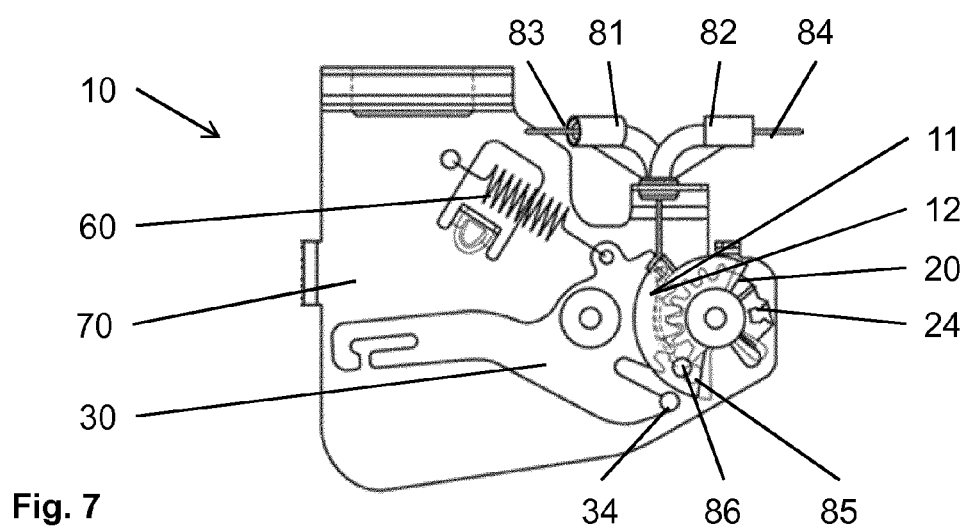
FIG. 7 is a schematic illustration of the unlocking unit with unlocked locking devices in the display position.

This state is illustrated in FIG. 7. The unlocking lever 30 is now in the hold-open position, and the unlocking unit 10 is in the display position. Although, in comparison to the activating position, the belt strap 62 is pulled partially into the backrest 3, the display region 64 of the belt strap 62 still protrudes out of the backrest 3 and is visible on the outside. The display region 64 is therefore still in the display position. This signals to a user that at least one of the two locking devices 90 is unlocked.

The rear feet 9 of the vehicle seat 1 can then be removed from the upper rails 6, and the vehicle seat 1 can be folded forward or removed from the vehicle. When the rear feet 9 are placed again onto the upper rails 6, the vehicle seat 1 can tilt. In this case, only one of the two locking devices 90 locks to the assigned pin in the upper rail 6, whereas the other of the two locking devices 90 does not lock, or locks only with a time delay, to the assigned pin in the upper rail 6.

Figure 8:
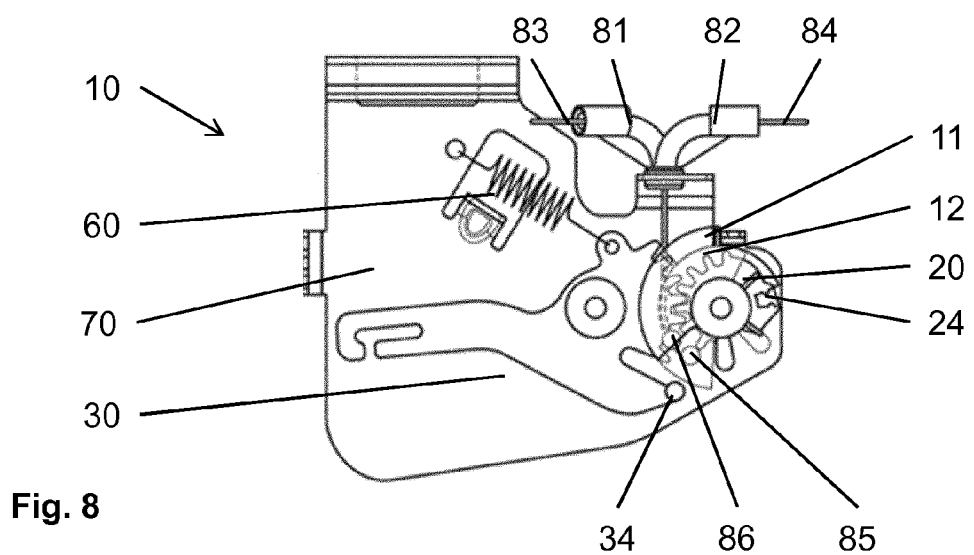
FIG. 8 is a schematic illustration of the unlocking unit with an unlocked and a locked locking device.

Such a state, in which the locking device 90 connected to the first unlocking element 11 is unlocked and the locking device 90 connected to the second unlocking element 12 is locked, is illustrated in FIG. 8. During the locking, the locking device 90 which is connected to the second unlocking element 12 pulls on the second Bowden cable 84, as a result of which the second unlocking element 12 is rotated into the locking position. However, the first unlocking element 11 remains in the unlocking position.

The stop element 34 of the unlocking lever 30 loses contact here with the second lateral surface 56, but still bears against the first lateral surface 55. The unlocking lever 30 therefore remains in the hold-open position, and the display region 64 of the belt strap 62 still protrudes out of the backrest 3. The display region 64 is therefore still in the display position and signals to a user that at least one of the two locking devices 90 is unlocked.

Figure 9:
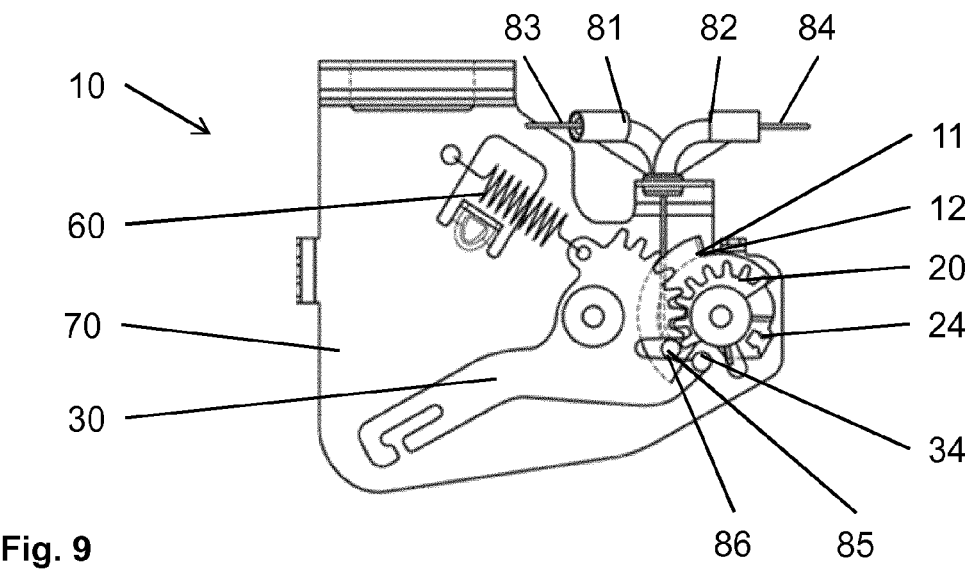
FIG. 9 is a schematic illustration of the unlocking unit with locked locking devices after return to the starting position.
Figure 10:
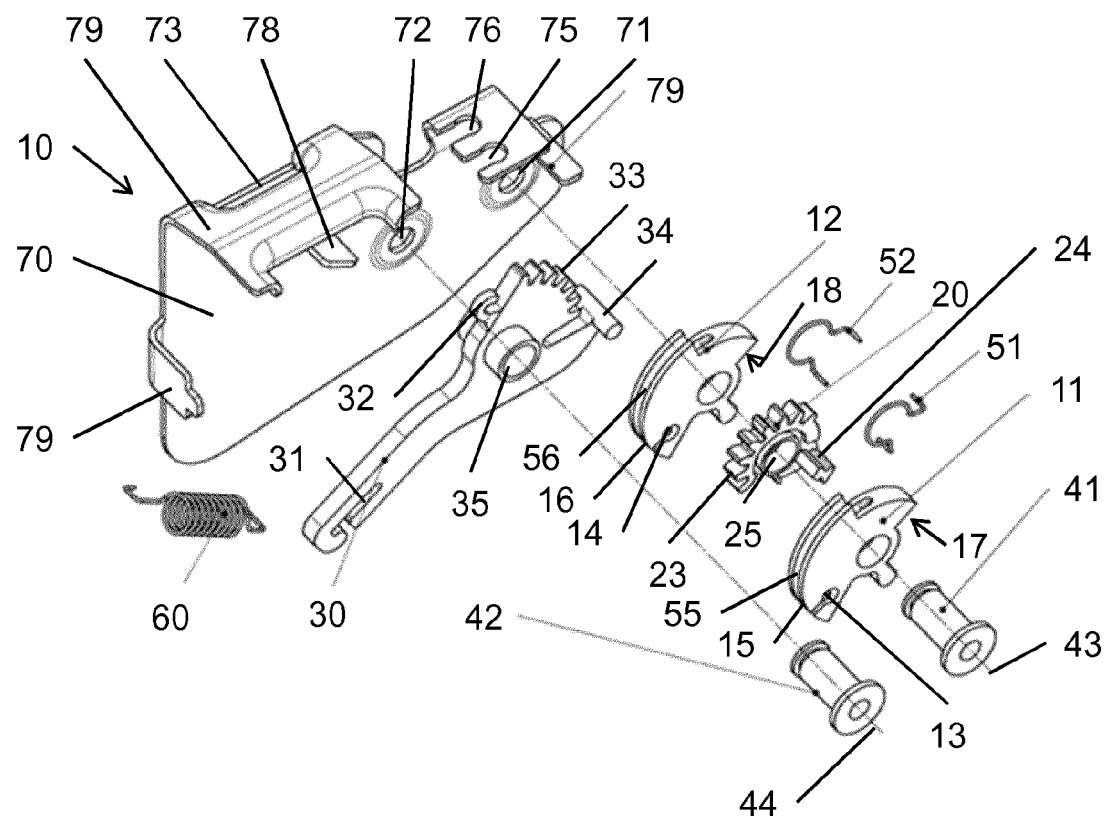
FIG. 10 is an exploded illustration of an unlocking unit.
Figure 11:
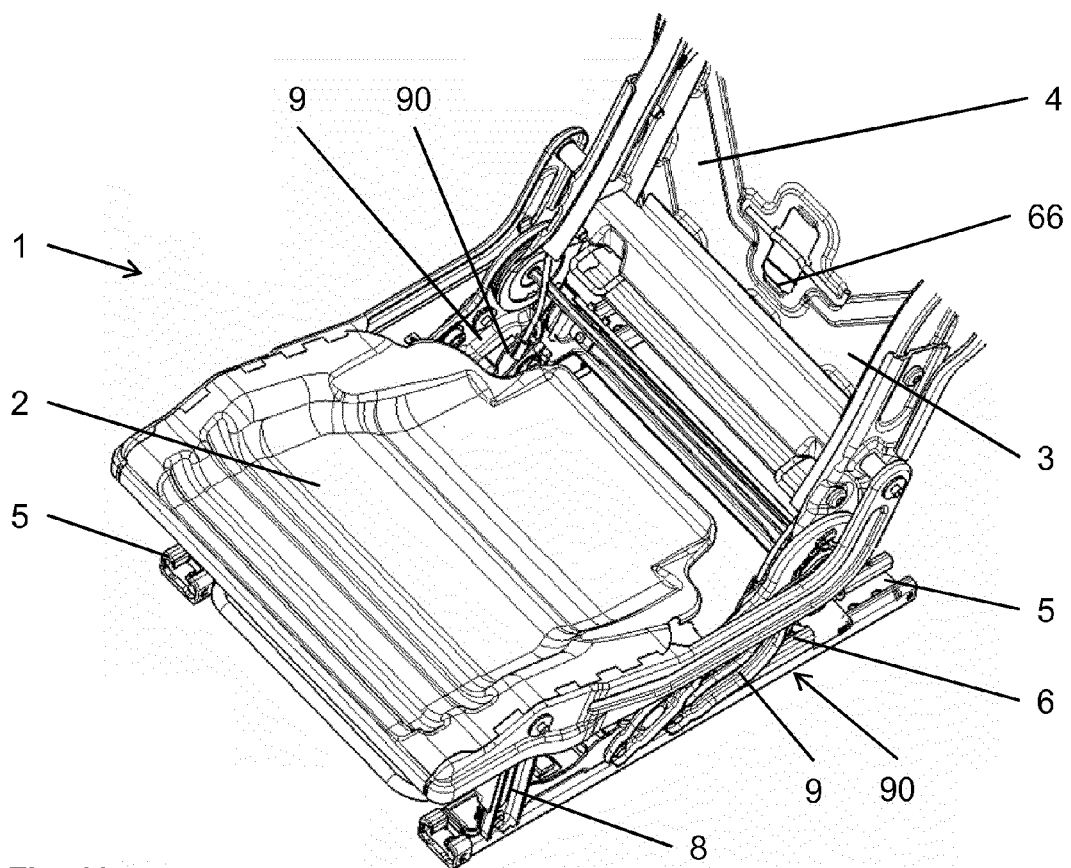
FIG. 11 is a perspective illustration of a vehicle seat structure.
Figure 12:
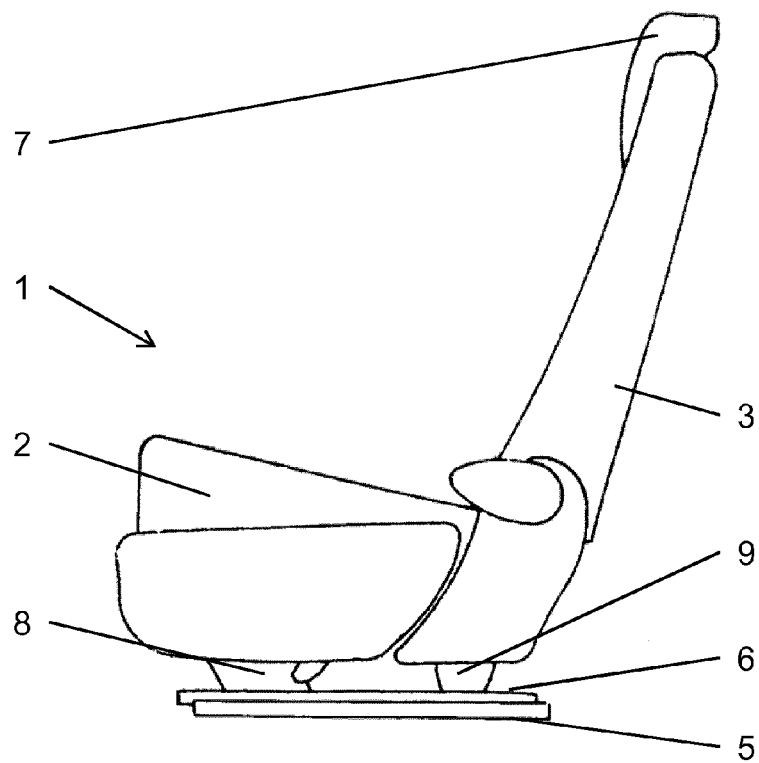
FIG. 12 is a schematic illustration of a vehicle seat.

If the locking device 90 which is connected to the first unlocking element 11 then also locks, said locking device pulls on the first Bowden cable 83, as a result of which the first unlocking element 11 is also rotated into the locking position. This state is illustrated in FIG. 9. In this case, the stop element 34 of the unlocking lever 30 also loses contact with the first lateral surface 55, and the unlocking lever 30 is rotated back into the rest position by the force of the return spring 60. The control gearwheel 20 is also rotated here back into the locking position.

The unlocking unit 10 is therefore in the starting position again. The belt strap 62 is pulled by the unlocking lever 30 into the backrest 3 to such an extent that the display region 64 of the belt strap 62 is substantially located within the backrest 3 and is not visible on the outside. The display region 64 is therefore in the non-display position again. This signals to a user that the two locking devices 90 are locked.

The unlocking unit 10 can also interact with more than two locking devices 90. In this case, for each locking device 90, a dedicated unlocking element is arranged on the rotary control pin 41.

The features disclosed in the above description, the claims and the drawings can be of importance both individually and in combination for implementing the invention in the various refinements thereof.

While specific embodiments of the invention have been shown and described in detail to illustrate the application of the principles of the invention, it will be understood that the invention may be embodied otherwise without departing from such principles.

The invention claimed is:

1. An unlocking unit for a vehicle seat, for unlocking at least two locking devices and transmitting a movement, which is introduced via an actuating element, for unlocking purposes to the at least two locking devices, the unlocking unit comprising:
    unlocking elements, wherein each of the unlocking elements is configured to be assigned to one of the locking devices, wherein the assigned unlocking element is configured to be in a locking position when the locking device is locked, wherein the assigned unlocking element is configured to be in an unlocking position when the locking device is unlocked; and
    a display element connected to said unlocking elements, said display element being configured to be in a display position when the at least two locking devices are unlocked, and configured to be in a non-display position when the at least two locking devices are locked, wherein each unlocking element, located in the unlocking position, prevents a movement of the display element into the non-display position, wherein the display element remains in the display position as long as at least one locking device is unlocked.

2. The unlocking unit as claimed in claim 1, wherein the display element is connected fixedly to the actuating element or is formed integrally therewith.

3. The unlocking unit as claimed in claim 1, wherein the display element is connected to a flexible belt strap.

4. The unlocking unit as claimed in claim 1, wherein a gearwheel mechanism is provided which transmits a movement for unlocking purposes to the unlocking elements, the gearwheel mechanism being connected to one or more of the unlocking elements.

5. The unlocking unit as claimed in claim 4, wherein the gearwheel mechanism comprises an unlocking lever with an unlocking toothing and a control gearwheel with a control toothing, wherein the unlocking lever is connected to the actuating element.

6. The unlocking unit as claimed in claim 5, wherein, in an event of a movement for unlocking purposes, the control gearwheel passes through an idle travel and then carries along the unlocking elements, the control gearwheel being connected to the idle travel.

7. The unlocking unit as claimed in claim 6, wherein a driver is attached to the control gearwheel, said driver striking against a first counterstop of the first unlocking element and against a second counterstop of the second unlocking element.

8. The unlocking unit as claimed in claim 5, wherein the unlocking lever has a stop element which, when the unlocking element is in the unlocking position, is in contact with the unlocking element.

9. The unlocking unit as claimed in claim 5, wherein a control spring is arranged in each case between the control gearwheel and each unlocking element, which control spring loads the unlocking element relative to the control gearwheel toward the unlocking position.

10. The unlocking unit as claimed in claim 5, wherein the unlocking elements and the control gearwheel are mounted rotatably about a common control pivot axis.

11. The unlocking unit as claimed in claim 10, wherein the control gearwheel is arranged in the axial direction between the first unlocking element and the second unlocking element.

12. The unlocking unit as claimed in claim 10, wherein the unlocking lever is mounted pivotably about an actuating pivot axis which extends parallel to a control pivot axis.

13. The unlocking unit as claimed in claim 5, wherein a return spring loads the unlocking lever constantly in a direction of a rest position, the spring being connected to the unlocking lever.

14. The unlocking unit as claimed in claim 1, wherein each of the unlocking elements is configured to be connected to one of the locking devices by means of a Bowden cable.

15. A vehicle seat comprising:
at least two locking devices;
an actuating element; and
an unlocking unit transmitting a movement, which is introduced via the actuating element, for unlocking purposes to the at least two locking devices, the unlocking unit comprising:
unlocking elements, wherein each locking device is in each case assigned one of the unlocking elements, wherein, when the locking device is locked, the assigned unlocking element is in a locking position, wherein, when the locking device is unlocked, the assigned unlocking element is in an unlocking position; and
a display element connected to the unlocking elements, the display element being in a display position when the at least two locking devices are unlocked, and in a non-display position when the at least two locking devices are locked, wherein each unlocking element, located in the unlocking position, prevents a movement of the display element into the non-display position, wherein the display element remains in the display position as long as at least one locking device is unlocked.

16. An unlocking unit for a vehicle seat, comprising:
a plurality of locking devices;
an actuating element;
unlocking elements, wherein each locking device is in each case assigned one of the unlocking elements, wherein, when the locking device is locked, the assigned unlocking element is in a locking position, wherein, when the locking device is unlocked, the assigned unlocking element is in an unlocking position; and
a display element connected to said unlocking elements, said display element being in a display position when the at least two locking devices are unlocked, and in a non-display position when the at least two locking devices are locked, wherein each unlocking element, located in the unlocking position, prevents a movement of the display element into the non-display position, wherein the display element remains in the display position as long as at least one locking device is unlocked.

* * * * *